March 6, 1956
H. L. BARTELT
2,737,278
DRIVE MECHANISM
Filed May 11, 1953
2 Sheets-Sheet 1
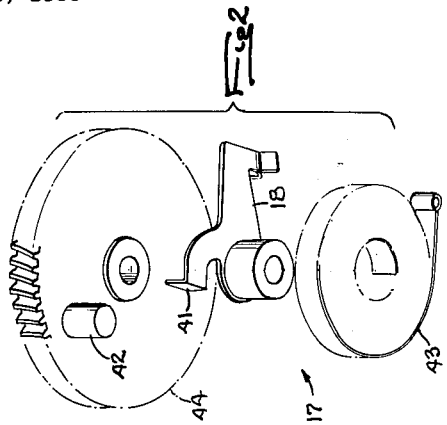
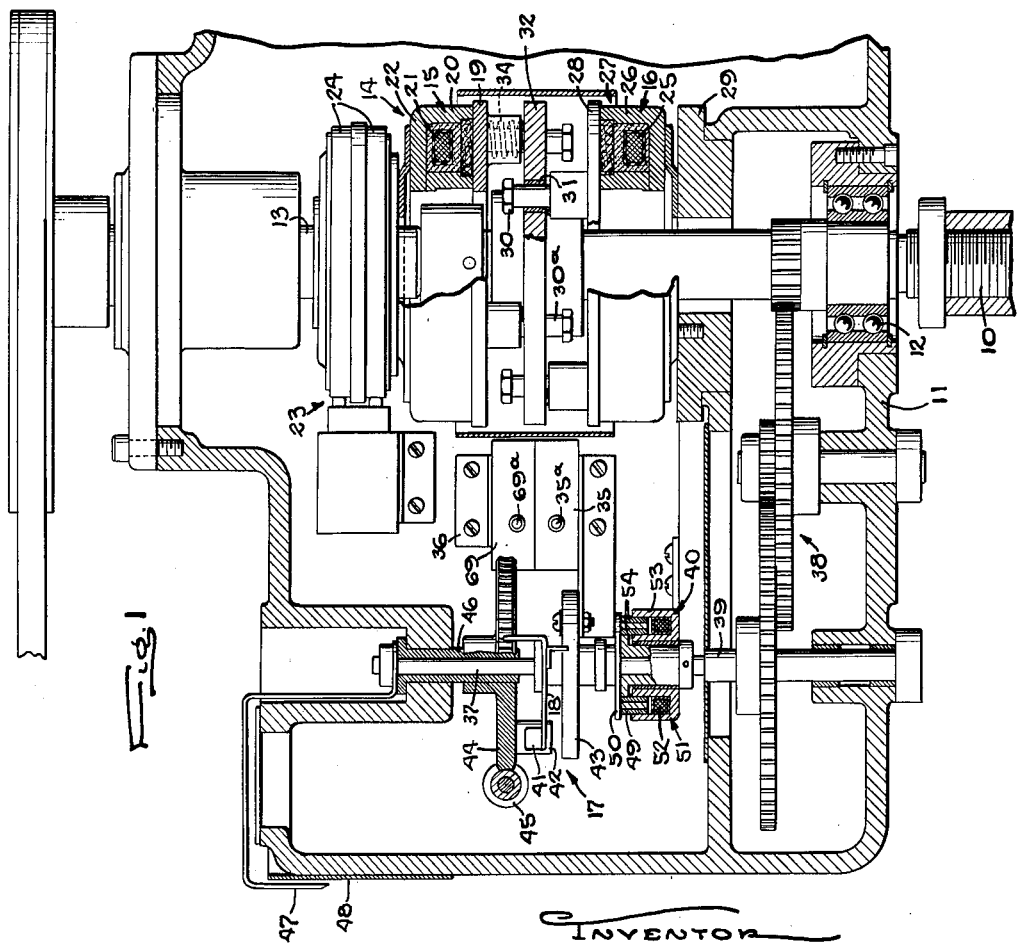
INVENTOR
Harold L. Bartelt
By Carlson, Pitzner, Hrrud+Wolfe
ATTORNEY March 6, 1956 H. L. BARTELT 2,737,278
DRIVE MECHANISM
Filed May 11, 1953 2 Sheets-Sheet 2
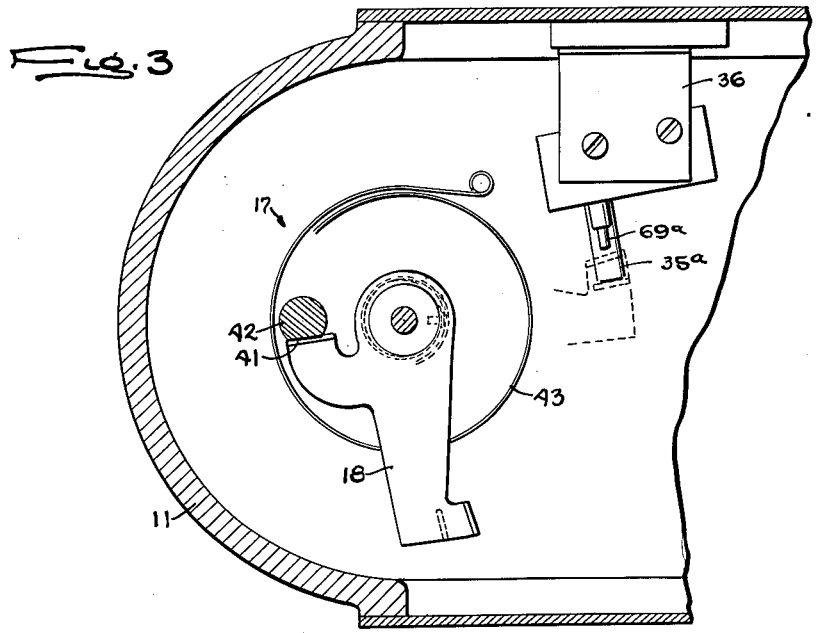
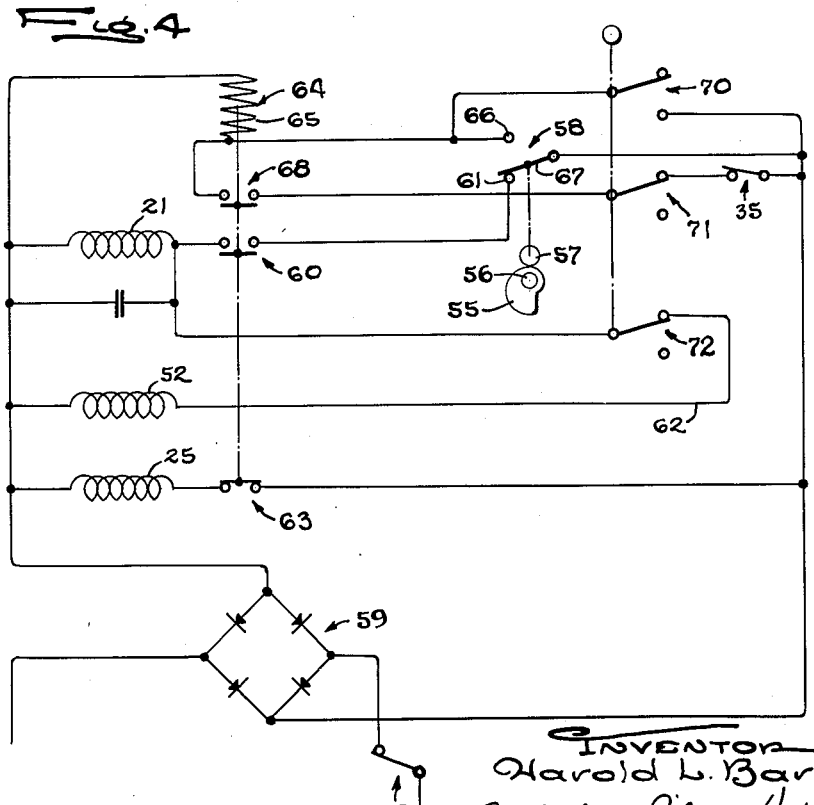
INVENTOR
Harold L. Bartelt
By Carlson, Pitzner, Hubbard & Wolfe
ATTORNEYS

United States Patent Office 2,737,278
Patented Mar. 6, 1956

2,737,278

DRIVE MECHANISM

Harold L. Bartelt, Rockford, Ill., assignor of forty-five per cent to Donald E. Bartelt, Rockford, Ill.

Application May 11, 1953, Serial No. 354,211

3 Claims. (Cl. 192—145)

This invention relates to a drive mechanism of the type in which a driven shaft is alternately connected to and disconnected from a continuously rotating driving shaft through the medium of a clutch so that the driven shaft is turned intermittently. Such mechanisms may employ a brake which, when the clutch is disengaged, is energized to stop the driven shaft and the angle through which the driven shaft turns during each operation may be determined by a timer controlling the clutch and the brake.

The general object is to provide a new and improved drive mechanism of the above character which turns the driven shaft through accurately measured angular increments in rapid succession.

A more detailed object is to achieve the foregoing object by using an electromagnetic clutch and an electromagnetic brake which respond almost instantly to the action of the timer so that the driven shaft is started and stopped with precision.

The invention also resides in the novel construction and arrangement of the timer and the manner in which the timer controls the energization of the clutch and brake.

Other objects and advantages of the invention will become apparent from the following detailed description taken in connection with the accompanying drawings, in which Figure 1 is a fragmentary side view of a drive mechanism embodying the novel features of the present invention and shows certain parts in section and other parts broken away.

Fig. 2 is a perspective view of the timer.

Fig. 3 is a sectional view taken along the line 3—3 in Fig. 1.

Fig. 4 is a wiring diagram of the circuits used in the drive mechanism.

As shown in the drawings for purpose of illustration, the invention is embodied in a system for turning a driven shaft 10 intermittently to operate a device such as an auger type dispenser (not shown). The driven shaft is disposed within a suitable housing 11 and is journaled in bearings 12 to be turned by a continuously rotating driving shaft 13 through the medium of a drive mechanism 14. The latter alternately connects and disconnects the two shafts to obtain the intermittent turning of the driven shaft.

In general, the drive mechanism 14 comprises a clutch 15 which, when engaged, connects the driving and driven shafts 10 and 13 for turning in unison and a brake 16 that holds the driven shaft against turning when energized. At the start of a cycle of operation, the clutch is engaged and the brake is deenergized so that the two shafts turn together and, after the driven shaft has turned through a predetermined angle, the clutch is disengaged and the brake is energized thus disconnecting the shafts and stopping the driven shaft. Operation of the clutch and brake at the proper time to stop the driven shaft after the desired turning is obtained through the action of a timing device 17. The latter includes a member 18, in this case a swinging arm, which is moved in response to turning of the driven shaft 10. At the start of a cycle, the arm 18 is in the position shown in full in Fig. 3 and, when the driven shaft begins to turn, the arm swings through a predetermined angular range to the position illustrated in broken lines in which position the arm is effective to disengage the clutch 15 and energize the brake 16.

In accordance with the present invention, the drive mechanism 14 is constructed in a novel manner to produce accurately measured increments of turning of the driven shaft 10 in rapid succession. For this purpose, both the clutch 15 and the brake 16 are of the electromagnetic type and each includes an energizing coil and parts producing a torque upon energization of the coil so that the clutch and brake respond quickly and without a substantial time lag in response to the operation of the timing device 17. Preferably, the torque producing parts of both the clutch and the brake frictionally engage each other and are in continuous mechanical contact so as to effect a substantially instantaneous gripping engagement in response to the energization of the coil.

In the present instance, the clutch 15 comprises an armature ring 19 rotatable with the driven shaft 10 and adapted for axial gripping engagement with a magnet 20 fast on the driving shaft 13. The magnet includes an energizing coil 21 wound within an annular core 22 of U-shaped cross section secured to the driving shaft. Current may be supplied to the coil 21 through stationary brushes 23 mounted on the housing 11 and collector rings 24 on the driving shaft. When the coil 21 is energized, the armature 19 grips the magnet core 22 connecting the two shafts 10 and 13 to rotate together. The brake 16 may be similar to the clutch 15 in that a coil 25 wound within an annular core 26 forms a magnet 27 which, when the coil is energized, grips an armature ring 28 turning with the driven shaft 10. In this case, however, the magnet is held against turning by bolting the core to a stationary bracket 29 on the housing 11 so that, when the armature is gripped by the magnet, the driven shaft is stopped.

To mount the armature rings 19 and 28 on the driven shaft 10, the two rings are connected together and the brake armature is secured to the driven shaft. For this purpose, the latter projects axially through the brake magnet 27 and the armature ring of the brake is fastened on the end of the driven shaft. Angularly spaced pins 29 and 30 project alternately from the back of the brake armature and the back of the clutch armature and slide in bearings 31 in a floating ring 32 disposed between the armatures so that the pins and the floating ring connect the armatures for rotation together while permitting independent axial movement of the armatures. Compression springs 33 surrounding the pins 29 and acting between the floating ring 32 and the brake armature 28 hold the latter in light mechanical contact with the face of the brake magnet 27 while similar springs 34 on the pins 30 hold the clutch armature 19 lightly against the magnet 20.

In order to deenergize the clutch coil 21 and energize the brake coil 25 simultaneously after the elapse of a predetermined interval of time, the arm 18 of the timing device 17 begins to turn away from its initial position when the driven shaft 10 starts to rotate and, after turning through a measured angle, it engages the actuator 35ᵃ (Fig. 3) of a normally closed switch 35 (Fig. 4) which is mounted in the housing 11 on a bracket 36 and controls the brake and clutch coils. To this end, the arm is fast on a shaft 37 (Fig. 1) journaled in the housing 11 and driven by one of the drive shafts, herein the driven shaft 10, through the medium of suitable gear reduction 38, a driving shaft 39, and a clutch 40 which is energized and deenergized simultaneously with the main clutch 15. The initial position of the arm 18 is determined by a lug 41 on the arm abutting against a stop 42 and the arm is biased toward this position by a coil spring 43 secured at one end to the housing 11 and at the other end to the timer shaft 37 and urging the latter clockwise as viewed in Fig. 3. Preferably, the stop 42 is carried by a worm wheel 44 engaging a worm 45 and fast on a sleeve 46 journaled on the timer shaft 37 so that the worm wheel may be turned to change the angular position of the stop and vary the length of the time interval during which the driven shaft 10 rotates. If desired, the sleeve 46 may carry a pointer 47 projecting out of the housing 11 and cooperating with a dial 48 to indicate the position of the stop.

In the present instance, the timer clutch 40 also is of the electromagnetic friction type and herein includes driving and driven elements 49 and 50 which are connected respectively to the timer shafts 39 and 37 and are engaged through the action of a stationary magnet 51. The latter is formed by an energizing coil 52 wound within an annular core 53 of U-shaped cross section bolted to the housing 11. The driving element 49 comprises a pair of radially spaced magnetically separated rings 54 disposed within the U of the core 53 and presenting axially facing annular pole faces to an armature ring which constitutes the driven element 50 of the timer clutch 40. Thus, when the coil 52 is energized, magnetic flux threads a closed path through the core 53, the rings 54, and the armature 50 drawing the latter into gripping engagement with the driving element 49 so that the shaft 37 carrying the arm 17 turns with the shaft 39 against the action of the spring 43.

Preferably each cycle of the drive mechanism is initiated automatically through the action of a suitable timing device. As shown in Fig. 4, the latter may be a cam 55 fast on a continuously rotating shaft 56 and engaging a follower roll 57. The follower roll actuates a switch 58 to condition a control circuit which, in turn, controls the energization of the brake and clutch coils 25, 21 and 52. In the present instance, the coil 21 of the main clutch 15 is adapted to be connected across the output of a rectifier 59 through a switch 60, which is normally open, and one contact 61 of the switch 58. The energizing circuit of the coil 52 of the timer clutch 40 includes a conductor 62 and the switches 60 and 58 while the energizing circuit of the brake coil 25 is completed through a normally closed switch 63. With this arrangement, the two clutches are disengaged and the brake is energized at the beginning of a cycle of operation.

The switch 60 controlling the energization of the main and timer clutches 15 and 40 and the switch 63 in the circuit of the brake coil 25 are parts of a relay 64 whose coil 65 is connected across the output of the rectifier 59 through the other contact 66 of the switch 58. Thus, when a rise on the cam 55 engages the follower roll 57, the contact arm 67 of the switch 58 is moved against the contact 66 and the relay 64 is energized to close the switch 60 and open the switch 63, a third switch 68 of the relay being closed at the same time to complete a holding circuit for the relay. With the latter energized, the brake is deenergized and the clutch coils are conditioned to be energized when a fall on the cam 55 permits the contact arm 67 to return to engagement with the contact 61 and complete the clutch coil circuits.

In order that the timing arm 18 simultaneously deenergizes the clutch coils 21 and 52 and energizes the brake coil 25 after turning through a predetermined angle, the switch 35 is disposed in the holding circuit of the relay 64 so that, when this switch is opened by the timer arm, the relay is deenergized. This results in opening of the switch 60 in the clutch coil circuits and closing of the brake coil switch 63. A normally closed safety switch 69 in the input to the rectifier 59 may be mounted on the bracket 36 with its actuator 69ª behind the actuator 35ª so as to be opened by the timer arm 18 after the switch 35 has been opened so that the entire system is disabled in the event that the timer clutch 40 fails to disengage at the proper time.

If desired, provision may be made for turning the driven shaft 10 continuously and independently of the timer 17. To this end, a gang switch, which includes normally open contacts 70 in a separate energizing circuit for the relay coil 65, normally closed contacts 71 in the relay holding circuit and normally closed contacts 72 in the circuit of the timer clutch coil 52, is utilized to convert from automatic to manual operation. When the contacts of the gang switch are in the positions for automatic control as shown in Fig. 4, the clutches and brake operate in response to the cam 55 and the timer 17 as previously described. By actuating the gang switch for manual control, however, the relay 64 is energized independently of the cam through the contacts 70 to close the switch 60 and open the switch 63 for energizing the main clutch coil 21 and deenergizing the brake coil 25. The timer clutch 40 remains disengaged since the energizing circuit of the coil 52 of this clutch is broken by opening of the gang switch contacts 72. Since the contacts 71 in the holding circuit of the relay are opened upon actuation of the gang switch for manual control, the relay is deenergized when the contacts of the gang switch are returned to their automatic positions.

In operation, assuming the parts to be in the position shown in Figs. 1 and 4, the main clutch 15 is disengaged and the brake 16 is energized while the timer clutch 40 is disengaged so that the spring 43 holds the timer arm 18 against the stop 42. When a rise on the cam 55 engages the follower roll 57, the contact arm 67 of the switch 58 is thrown to close the circuit of the relay 64 which closes the switch 60 in the circuits of the clutch coils 21 and 52, opens the brake switch 63 and completes its holding circuit through the switch 68. At this time, the brake 16 releases the driven shaft 10 but neither of the clutches are engaged since the circuits of their coils are opened by the switch 58. The latter completes the clutch coil circuits when a fall on the cam 55 engages the follower roll 57 to permit the switch arm 67 to engage the contact 61. With the clutch coils energized, the driven shaft 10 turns with the driving shaft 13 and, at the same time, the timing shaft 37 is turned against the action of the spring 43 through the gearing 38 and the clutch 40. When the timing shaft has turned through the desired angle, the timer arm 18 opens the switch 35 which breaks the holding circuit of the relay 64. The latter, being deenergized, simultaneously deenergizes the clutch coil 21 and energizes the brake coil 25 through the action of the switches 60 and 63 thus instantly disconnecting the driven shaft from the driving shaft and stopping the driven shaft. The coil circuit of the timer clutch 40 also is opened upon deenergization of the relay permitting the spring 43 to turn the timer arm 18 back against the stop 42 preparatory to the start of the next cycle.

By using an electromagnetic clutch 15 and an electromagnetic brake 16, the two respond almost instantaneously upon opening of the timer switch 35. Time lag due to mechanical movement is substantially eliminated since the clutch and brake are of the friction type with the elements in contact with each other at all times. As a result of the instantaneous action of the clutch and brake, it is possible to obtain a rapid succession of accurately measured angular movements of the driven shaft 10 which thus may be used for precision jobs such as driving a mechanism for metering measured quantities of material. Employing an electromagnetic friction clutch 40 in the timer 17 permits the entire drive mechanism to be operated electrically and increases the accuracy of the timer.

I claim as my invention:

1. A drive mechanism having, in combination, a first electromagnetic clutch having an energizing coil and driving and driven elements transmitting a torque upon energization of said coil, a timing member connected to said driven element for movement through a predetermined distance from a first position upon energization of said coil, means biasing said member toward said first position, a driving shaft, a driven shaft, a connection between one of said shafts and said driving element to turn the latter when said one shaft is rotating, a second and similar electromagnetic clutch having driving and driven elements connected respectively to said driving and driven shafts, an electromagnetic brake having an energizing coil and a braking element cooperating with a part on said driven shaft to produce a torque when the coil is energized and hold the driven shaft against turning, separate circuits for each of said coils, a control circuit for opening and closing said coil circuits, means for energizing said control circuit to close said clutch coil circuits and open said brake coil circuit, and a switch actuated by said timing member in said second position and operable when actuated to reverse the energization of said control circuit thereby to simultaneously open said clutch coil circuits and close said brake coil circuit.

2. A drive mechanism having, in combination, an electromagnetic friction clutch having an energizing coil and driving and driven elements in mechanical contact when said coil is deenergized and in gripping engagement to transmit a torque when the coil is energized, a driving shaft connected to said driving element, a driven shaft connected to said driven element, an electromagnetic friction brake having an energizing coil and a nonrotatable braking element in mechanical contact with a part on said driven shaft when the brake coil is deenergized and in gripping engagement with said part when the coil is energized, a second and similar electromagnetic clutch having a driving element connected to and driven by one of said shafts, a timing member connected to the driven element of said second clutch for movement through a predetermined range from a first position to a second position when the coil of the second clutch is energized, means biasing said member toward said first position, means for energizing said clutch coils and deenergizing said brake coil to initiate turning of said driven shaft and movement of said timing member through said range, and a sensing device responsive to said timing member in said second position and operable simultaneously to deenergize said clutch coils and energize said brake coil thereby to stop said driven shaft.

3. A drive mechanism comprising, a driving shaft, a driven shaft, an electromagnetic clutch having an energizing coil and driving and driven elements transmitting a torque when said coil is energized and connected respectively to said driving and driven shafts, an electromagnetic brake having an energizing coil and a braking element cooperating with a part on said driven shaft to produce a torque and hold the driven shaft against rotation when the brake coil is energized, a second and similar electromagnetic clutch having a driving element connected to and driven by one of said shafts, a timing member connected to the driven element of said second clutch for movement through a predetermined range from a first position to a second position when the coil of the second clutch is energized, means biasing said member toward said first position, means for energizing said clutch coils and deenergizing said brake coil to initiate turning of said driven shaft and movement of said timing member through said range, and a sensing device responsive to said timing member in said second position and operable simultaneously to deenergize said clutch coils and energize said brake coil thereby to stop said driven shaft.

References Cited in the file of this patent

UNITED STATES PATENTS

| | | |
|---|---|---|
| 2,118,944 | Purdy | May 31, 1938 |
| 2,334,137 | Wagner et al. | Nov. 9, 1943 |
| 2,572,272 | McLagan | Oct. 23, 1951 |
| 2,600,667 | Mason | June 17, 1952 |
| 2,620,136 | Levine | Dec. 2, 1952 |